United States Patent [19]

Reid

[11] 4,222,704

[45] Sep. 16, 1980

[54] ROLLER SUPPORT FOR A LIFT PUMP

[75] Inventor: Robert A. Reid, Charlton City, Mass.

[73] Assignee: CPC Engineering Corporation, Sturbridge, Mass.

[21] Appl. No.: 44,239

[22] Filed: May 31, 1979

[51] Int. Cl.³ .............................................. F03B 3/12
[52] U.S. Cl. ...................................... 415/72; 308/203
[58] Field of Search ..................... 415/72, 73, 122 A; 308/203, 204, 2 R, 2 A, 73

[56] References Cited

U.S. PATENT DOCUMENTS

| | | | |
|---|---|---|---|
| 2,551,774 | 5/1951 | Traylor | 308/203 |
| 3,918,770 | 11/1975 | Rouch | 308/2 R |
| 4,019,830 | 4/1977 | Reid | 415/72 |
| 4,160,569 | 7/1979 | Reid | 415/73 |

Primary Examiner—Lenard A. Footland
Attorney, Agent, or Firm—Eugene E. Geoffrey, Jr.

[57] ABSTRACT

A bearing support for cylindrical lift pumps wherein the support comprises an elongated carriage positioned transversely of the pump, a pair of spaced parallel rollers on said carriage and pivots for supporting the carriage on a base. With the pressure of the pump on the rollers, the carriage will tilt to permit the rollers to maintain line contact with the pump and the carriage is arranged to provide for independent deflection of the rollers to compensate for deviation of the pump from a true cylindrical configuration.

9 Claims, 10 Drawing Figures

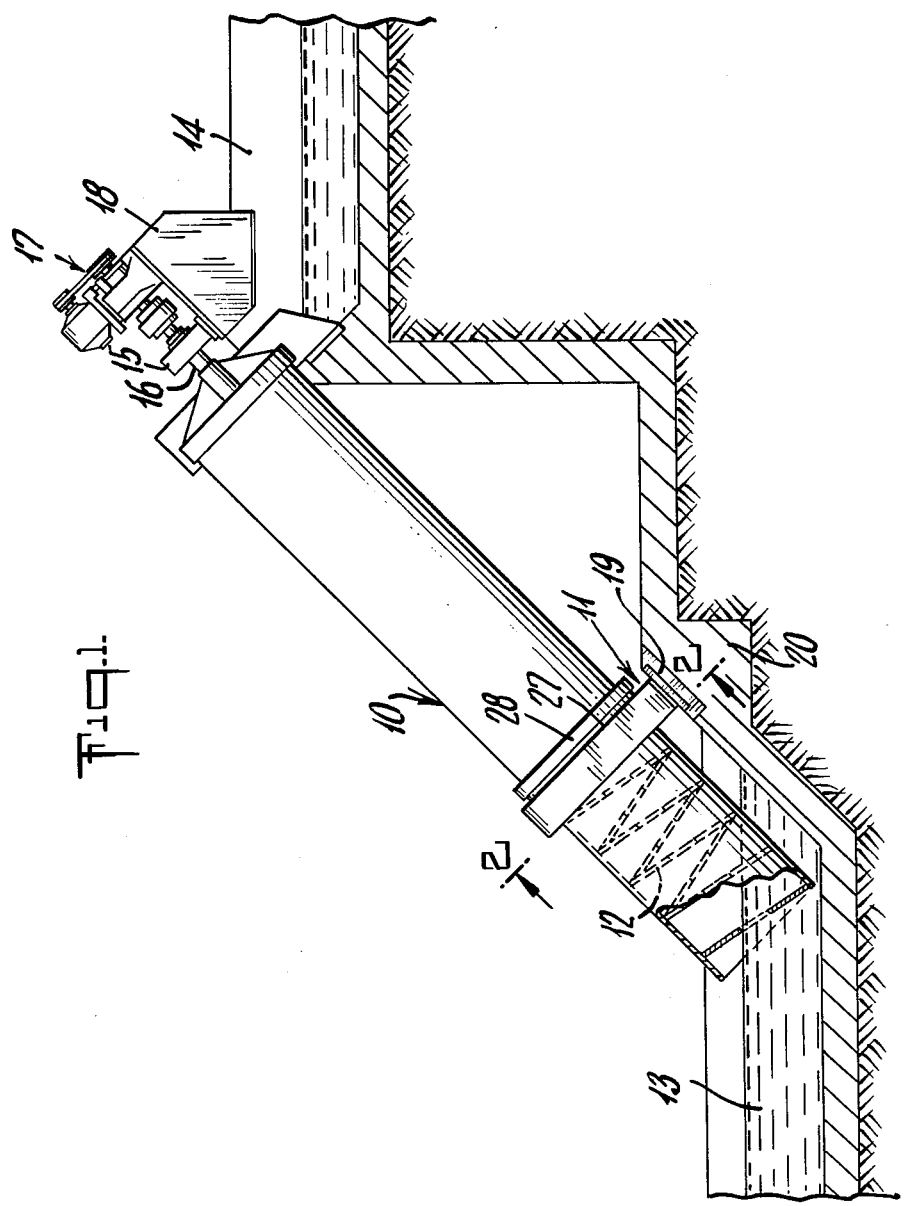

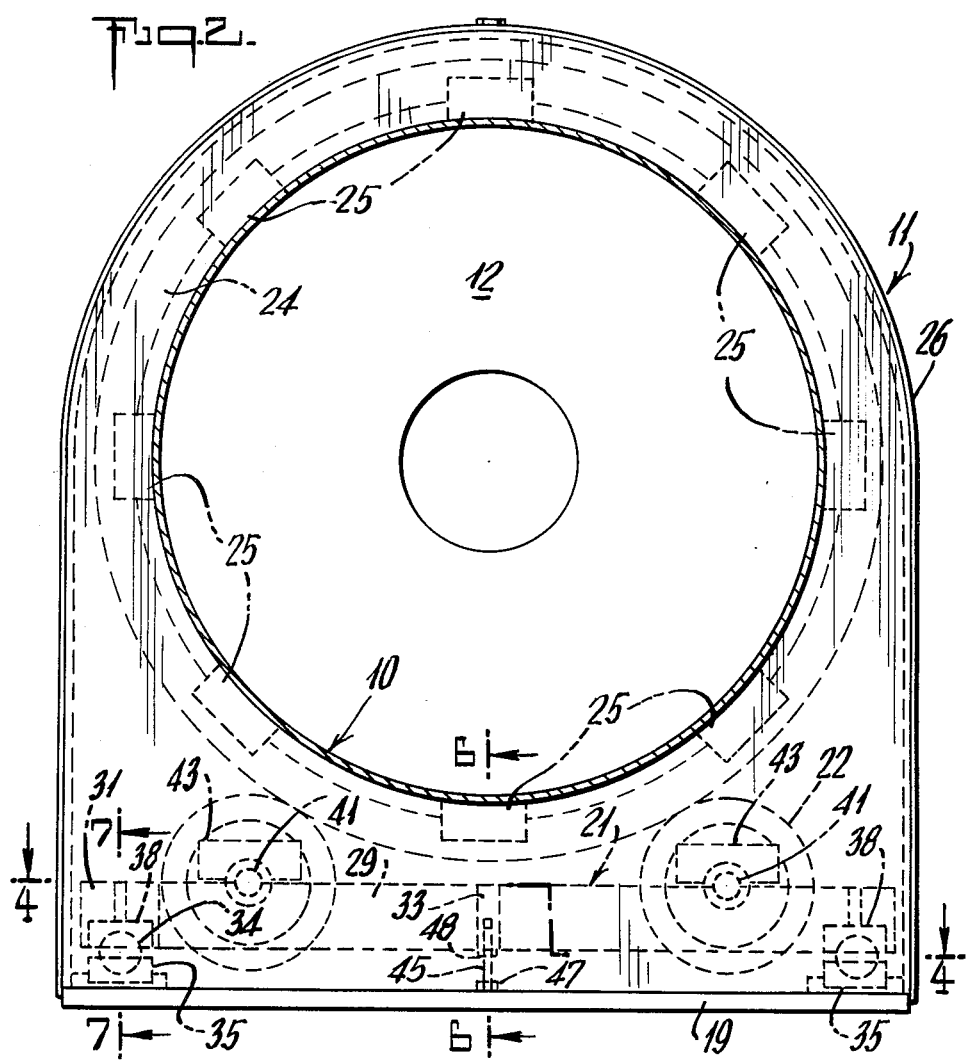
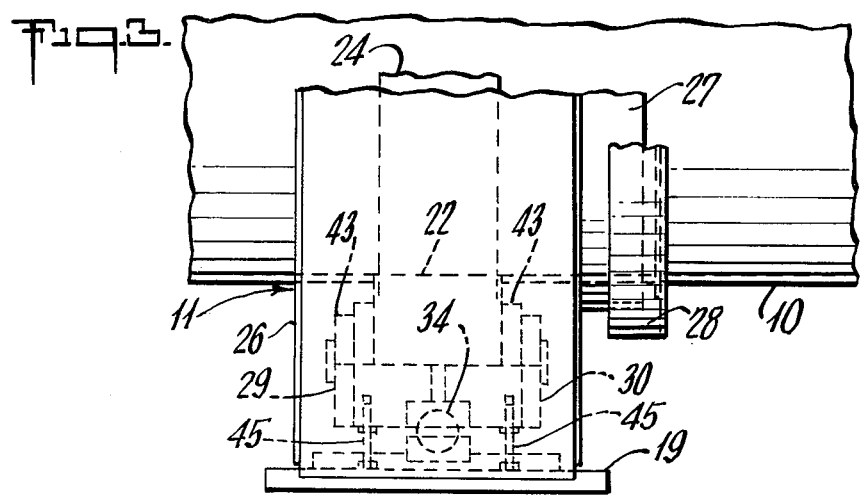

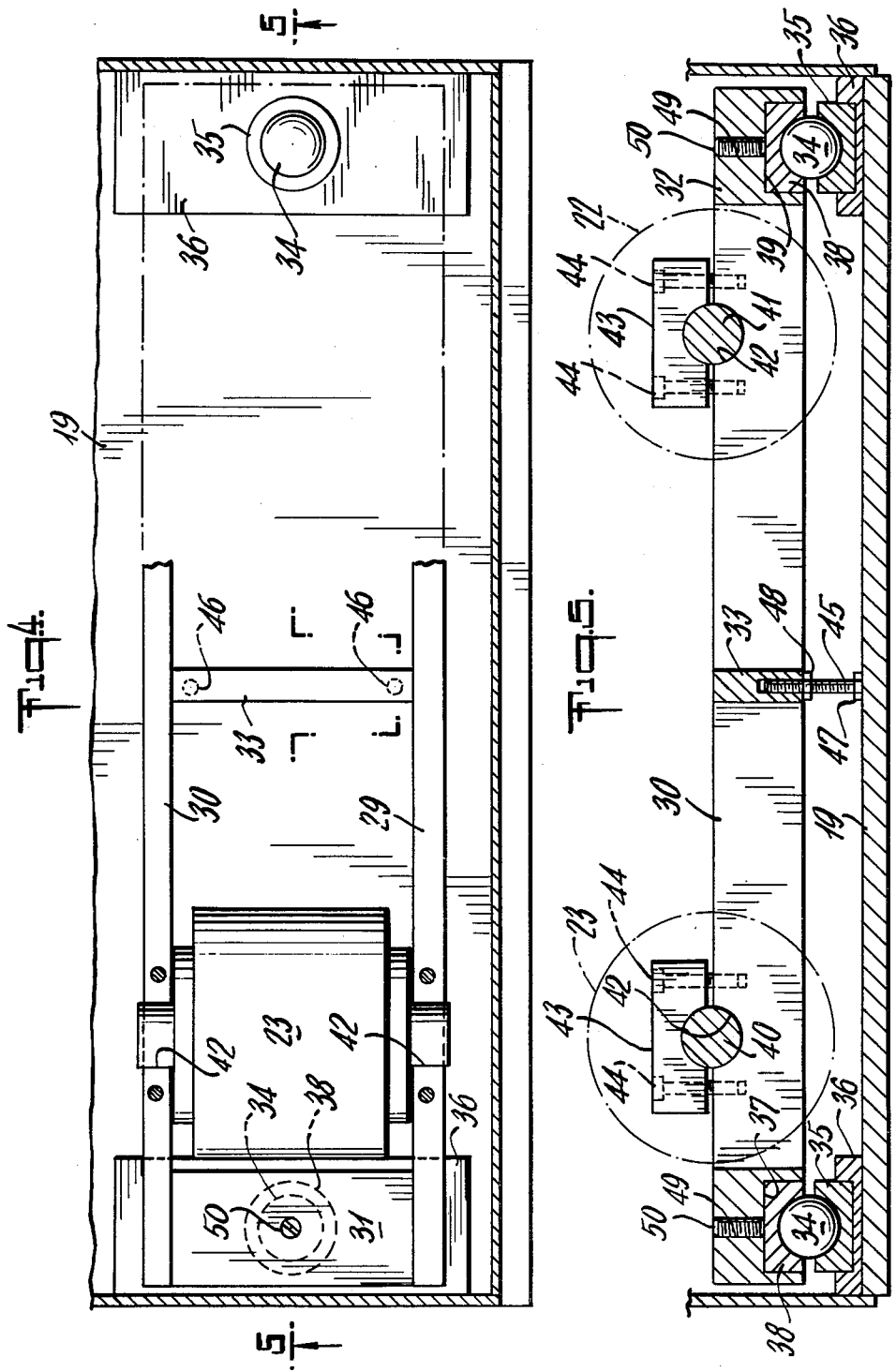

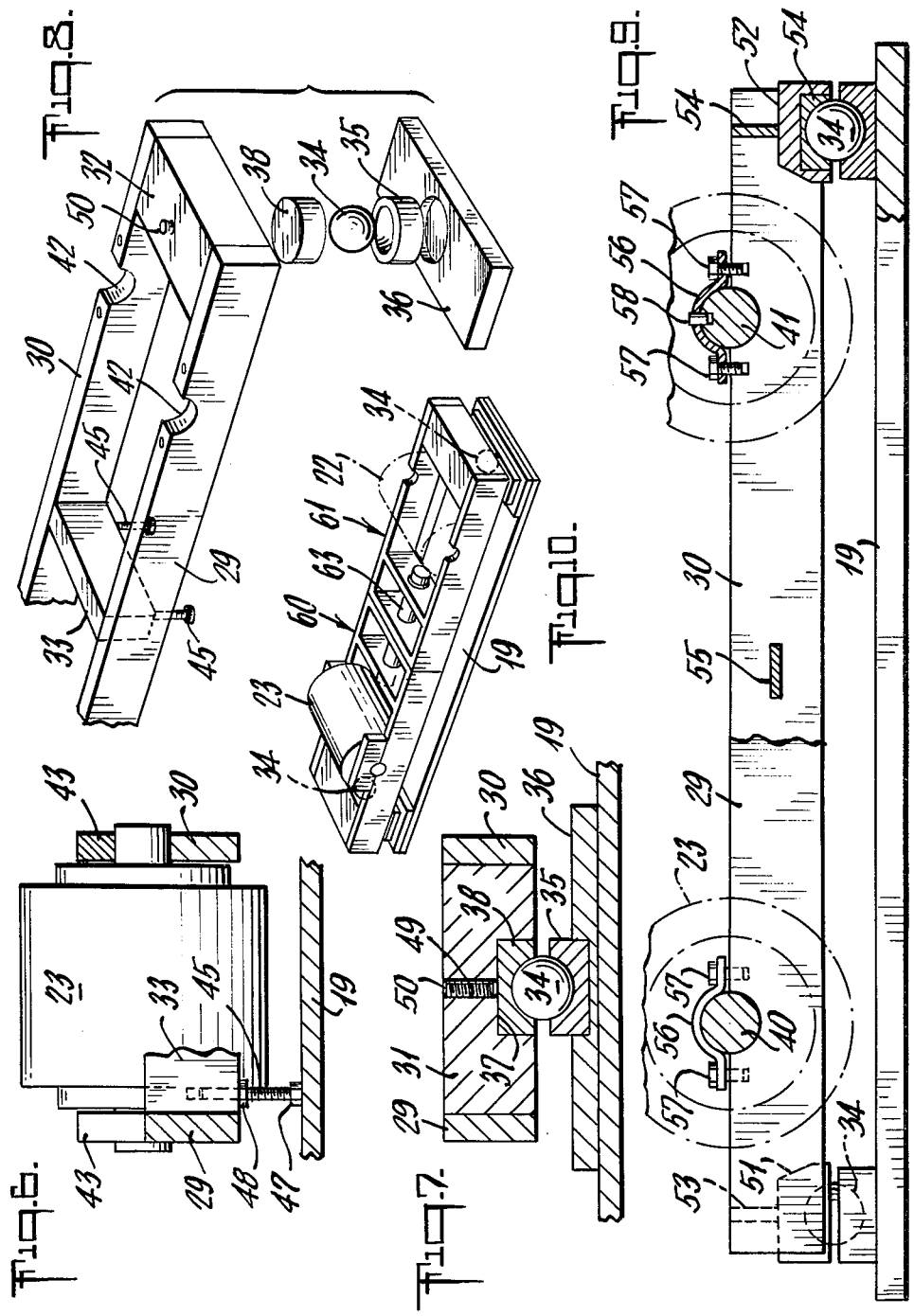

ROLLER SUPPORT FOR A LIFT PUMP

This invention relates to a cylindrical lift pump embodying an internal screw for raising large volumes of fluid such as sewage and the like and more specifically to a novel and improved bearing assembly for supporting the pump.

Lift pumps are generally inclined elongated cylindrical structures having an internal screw and function to lift liquids from one level to another. These pumps are of relatively large diameter and capable of handling liquids containing large proportions of solid matter such as sewage and the like. One form of such a pump is disclosed in U.S. Pat. No. 4,019,830 granted Apr. 26, 1977 while a bearing support therefor is disclosed in U.S. patent application Ser. No. 925,360 filed Jul. 17, 1978. This invention constitutes a modified form of the roller support disclosed in the aforesaid application Ser. No. 925,306, now U.S. Pat. No. 4,160,569.

One object of the invention resides in the provision of a novel and improved roller support for lift pumps of the type referred to above and which is characterized by its simplicity, ease of installation and maintenance and relatively low cost while at the same time insuring line contact between the supporting rollers and the cylindrical lift pump structure to minimize wear on the rollers as well as the structure supported thereby.

Another object of the invention resides in the provision of a novel and improved roller support for cylindrical lift pumps.

The roller support for lift pumps in accordance with the invention utilizes an elongated carriage carrying a pair of spaced rollers. The carriage is arranged to afford substantial resistance to stress in a direction normal to the lift pump being supported and at the same time permits a material degree of longitudinal twist. The carriage is supported at each end by a universal pivot with the result that any deviations of the lift pump from a true circle or warpage of the cylindrical structure will cause the roller axes and the adjoining ends of the carriage to shift about a central longitudinal axis of the carriage and thus permit the rollers to maintain line contact with the cylindrical lift pump.

The above and other objects and advantages of the invention will become more apparent from the following description and accompanying drawings forming part of this application.

IN THE DRAWINGS:

FIG. 1 is a side elevational view in partial section of one embodiment of a lift pump with a roller support in accordance with the invention;

FIG. 2 is a cross sectional view of the roller support shown in FIG. 1 and taken along the line 2—2 thereof;

FIG. 3 is a fragmentary side elevational view of the novel and improved roller support illustrated in FIG. 2;

FIG. 4 is a cross sectional view of FIG. 2 taken along the line 4—4 thereof;

FIG. 5 is a cross sectional view of FIG. 4 taken along the line of 5—5 thereof;

FIG. 6 is a cross sectional view of FIG. 2 taken along the line of 6—6 thereof;

FIG. 7 is a cross sectional view of FIG. 2 taken along the line 7—7 thereof;

FIG. 8 is a fragmentary perspective view in exploded form showing the pivotal support for one end of a carriage in accordance with the invention;

FIG. 9 is a view similar to FIG. 5 illustrating a modified embodiment of the invention; and FIG. 10 is a diagramatic perspective view of still another embodiment of the invention.

Referring now to the drawings, a lift pump with the novel and improved support thereof is shown in side elevation in FIG. 1 with the pump generally denoted by the numeral 10 and the bearing support denoted by the numeral 11. The lift pump 10 has a plurality of internal flights 12 for lifting large volumes of liquid, which may or may not contain relatively large lumps of solid matter, from a sump 13 to a discharge receiver or trough 14. The upper end of the pump 10 is supported by a bearing 15 and shaft 16, the latter extending from and secured to the pump 10. The bearing together with a driving assembly generally denoted by the numeral 17 are carried on a fixed support 18. It is evident however that the upper end of the pump may be supported in any desired manner and any suitable driving means may be utilized for rotation of the pump.

The bottom end of the pump is supported by a roller structure which as will be shown is arranged to compensate for deviations of the cylindrical pump from a true circle as well as warpage which occurs by reason of uneven heating of the structure and deflection which may occur by reason of the large volumes of liquid being carried by the pump. The bearing structure 11 is shown in detail in FIGS. 2 through 8 and reference will now be made to those figures.

The roller support 11 includes a base 19 anchored in a concrete support 20. A carriage 21 carrying rollers 22 and 23 is pivotally supported at its ends on the base 19. The cylindrical pump 10 preferably carries an annular ring 24 secured to the pump by a plurality of brackets 25. The ring 24 engages the rollers 22 and 23 to rotatably support the pump 10. The roller support structure and annular ring are enclosed by an outer housing 26 which may take any suitable configuration.

The upper end of the housing 26 has an annular ring 27 extending therefrom and an L-shaped ring 28 is carried by the pump 10 and overlaps the ring 27 to prevent the possibility of liquids draining into the roller support housing 26. The carriage 21 and rollers carried thereby are shown in detail in FIGS. 4 through 8. The carriage 21 comprises a pair of parallel beams 29 and 30 which are maintained in parallel relationship by transverse end blocks 31 and 32 and by a transverse intermediate element 33. The blocks 31 and 32 and the transverse element 33 are preferably welded or otherwise secured to the beams 29 and 30. The beams 29 and 30 have a depth substantially greater than the width and since the depth of the beam is positioned substantially normal to the lift pump 10 they will readily support the weight of the pump. At the same time, the beams can twist to accommodate irregularities in the annular ring 24 so that the rollers carried by the beams will always maintain line contact with the ring. This action is obtained by the utilization of ball pivots 34 on each end of the carriage.

More specifically, the base 19 carries a pair of bearing blocks 35 having spherical recesses therein and secured to base plates 36 which in turn are fixedly secured to the base 19 by welding or other suitable procedure. The transverse blocks 31 and 32 are each recessed on the underside thereof as denoted by the numerals 37 and 39 to accommodate upper bearing blocks 38 each having a spherical recess therein. The ball pivots 34 engage the recess as in the bearing blocks 35 and 38 so that the beams 29 and 30 can twist when subjected to the weight of the pump via the rollers 22 and 23 carried by the beams.

The rollers 22 and 23 are carried by individual shafts 40 and 41 set in recesses 42 in the beams 29 and 30 and are held in place by blocks 43 which are secured to the beams 29 and 30 by machine screws or bolts 44. The rollers are rotatably mounted on the shafts 40 and 41 and function to support the cylindrical housing of the lift pump as illustrated in FIGS. 1, 2 and 3. If desired, a pair of bolts 45 may be arranged to threadably engage threaded openings 46 in the transverse element 33 and adjusted so that the heads 47 just clear the base plate 19. The bolts 45 would then be locked in position by the nuts 48. In this way, flexing of the beams 29 and 30 would be limited and at the same time the beams 29 and 30 would be permitted to twist in order to cause the rollers 22 and 23 to maintain line contact with the surrounding ring 24.

With the structure thus far described, it is evident that the two rollers 22 and 23 can be displaced in planes normal to the beams 29 and 30 and since the beams 29 and 30 may twist the rollers will maintain substantially line contact at all times with the ring 24. Furthermore, in the event it is necessary to replace the entire carriage 21 together with the rollers 22 and 23 and the ball pivots 34, it is merely necessary to elevate the lift pump a few inches whereupon the carriage 21 may be readily removed together with the bearing blocks 35 and 38 and the ball pivots 34. A new carriage can then be placed in position with new bearing blocks and ball pivots. In this way, the down time for replacement of the entire structure 21 would be less than an hour and in most instances would require very much shorter time.

In order to facilitate removal of the upper bearing blocks 38 from the ends of the carriage 21, the end blocks 31 and 32 are provided with threaded openings 49 to receive screws such as set screws or the like 50 in order to urge the bearing blocks 38 out of engagement with the transverse blocks 31 and 32.

A modified form of the invention is illustrated in FIG. 9. In this form, the transverse blocks denoted herein by the numerals 51 and 52 have a thickness which is about one-half the height of the beams 29 and 30 and narrow transverse members 53 and 54 extend upwardly from the blocks 51 and 52. The underside of the transverse blocks 51 and 52 are recessed to receive bearing blocks 54 which engage the ball pivots 34. The central transverse member 33 is replaced by the transverse member 55 which is positioned horizontally between the beams 29 and 30. This construction permits the beams 29 and 30 to twist somewhat more readily while at the same time affording the same degree of support for the lift pump. In as much as the pressure on the rollers 22 and 23 is essentially downward and against the beams 29 and 30, the shafts 40 and 41 need only be held in position by light metal straps 56 secured to the beams 29 and 30 by cap screws 57. If desired, pins 58 may be inserted through the straps 56 and into previously formed openings in the shafts 40 and 41 to prevent the shafts 40 and 41 from rotating relative to the beams 29 and 30.

Still another embodiment of the invention is illustrated diagramtically in FIG. 10. In this figure, the carriage is generally denoted by the numeral 21' and is formed of two individual sections 60 and 61 with the section 60 carrying roller 23 and the section 61 carrying roller 22. The two sections 60 and 61 of the carriage are coupled by a shaft 63 co-axial with the central longitudinal axis of the carriage sections 60 and 61 so that the sections can rotate about the axis 63 relative one to the other. Since the carriage 21' is supported by ball pivots 34 as previously described the rollers 22 and 23 will support the lift pump and maintain substantial line contact with ring 24 at all times to minimize wear both on the ring carried by the pump and the rollers 22 and 23.

While only certain embodiments of the invention have been illustrated and described, it is understood that alterations, changes and modifications may be made without departing from the true scope and spirit thereof.

What is claimed is:

1. A roller bearing support for cylindrical elongated lift pumps comprising an elongated carriage for positioning transversely of said pump, a fixed base, means on each end of said carriage pivotally supporting said carriage on said base and a pair of spaced axially aligned rollers on said carriage, said rollers being arranged to engage and support said cylindrical lift pump and ends of said carriage being deflectable one relative to the other about a central longitudinal axis whereby said rollers will maintain substantially line contact with said pump notwithstanding deviations of said pump from a true axial configuration.

2. A roller bearing support according to claim 1 wherein said pivotal supporting means are spherical bearings and said base and carriage each include bearing blocks having spherical recesses therein for engagement of said spherical bearings.

3. A roller bearing support according to claim 1 wherein said carriage includes a pair of spaced parallel longitudinal beams, transverse blocks secured between the ends of the beams and said pivotal supporting means are disposed between each block and said base.

4. A roller bearing support according to claim 3 wherein said pivotal supporting means are spherical bearings positioned between each of said transverse blocks and said base.

5. A roller bearing support according to claim 1 wherein said carriage comprises two independent sections and a shaft rotatably coupling said sections, said rollers each being carried by one of said sections with the axis thereof being disposed transversely of the axis of said shaft and said pivotal means are disposed between each section and said base.

6. A roller bearing support according to claim 1 wherein said carriage is formed of two spaced longitudinal beams, transverse means disposed between and secured to the ends of said beams, and roller shaft receiving means in the upper faces of said beams to receive and retain said rollers in spaced parallel relationship, said pivotal supporting means comprising a pair of spherical bearings, a pair of bearing blocks carried by said base and having spherical recesses formed therein to partially receive said spherical bearings and said transverse means each having a spherical recess therein to engage the top sides of said spherical bearings whereby said carriage is pivotally carried by the base and the ends of said carriage together with the rollers are individually deflectable.

7. In a cylindrical lift pump for liquids, sewage and the like having an elongated cylindrical housing, a screw fixed within the housing and support means on at least one end thereof for rotatably maintaining said pump in a selected axial position and means for rotating said cylindrical housing, a roller bearing support for cooperating with said support means for maintaining said pump in a selected inclined position, said roller bearing support comprising an elongated carriage extending transversely of said pump, a pair of spaced axially aligned rollers on said carriage, a fixed base support, means at each end of said carriage for pivotally supporting said carriage on said base support, the end portions of said carriage being capable of deflection one relative to the other and about the central longitudinal axis of the carriage whereby said rollers will shift in planes substantially normal to the carriage and intersecting the roller shafts and thus maintain substantially line contact with said cylindrical lift pump housing.

8. In a cylindrical pump for liquids according to claim 7 wherein said pivotal supporting means are spherical bearings and said base and carriage each include bearing blocks having spherical recesses therein for engagement of said spherical bearings.

9. In a cylindrical pump for liquids according to claim 7 wherein said carriage comprises two independent sections and a shaft rotatably coupling said sections, said rollers each being carried by one of said sections with the axis thereof being disposed transversely of the axis of said shaft and said pivotal means are disposed between each section and said base.

* * * * *